P. TALTAVULL.
Bee Hive.
No. 21,912. Patented Oct. 26, 1858.
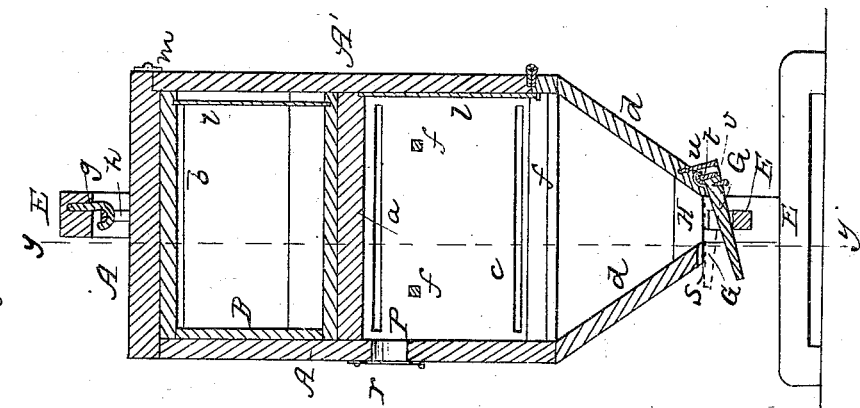
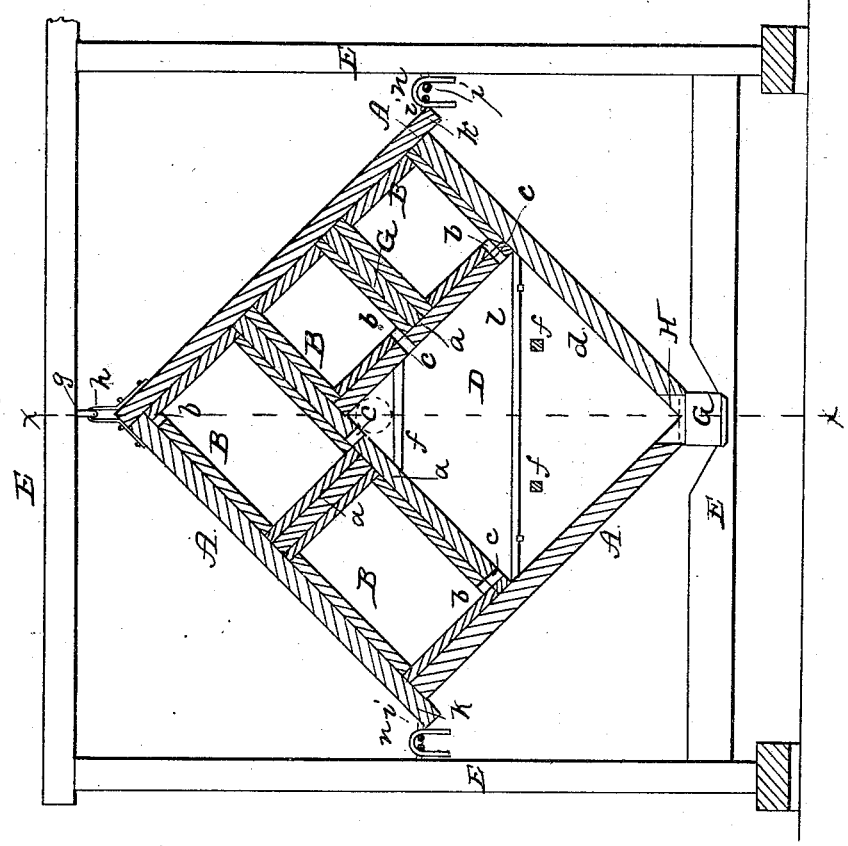

UNITED STATES PATENT OFFICE.

PETER TALTAVULL, OF WASHINGTON, DISTRICT OF COLUMBIA.

BEEHIVE.

Specification of Letters Patent No. 21,912, dated October 26, 1858.

*To all whom it may concern:*

Be it known that I, PETER TALTAVULL, of Washington, District of Columbia, have invented a new and Improved Beehive; and I do hereby declare that the following is a full and exact description thereof, reference being had to the accompanying drawings, making part of this specification.

Figure 1, is a vertical section of the hive, in the plane indicated by the line $y\ y$, Fig. 2; and Fig. 2, a vertical section thereof, in a plane at right-angles to that of the other section, indicated by the line $x\ x$, Fig. 1.

Like letters designate corresponding parts in both figures.

I construct a rectangular box A, of sufficient size, and suitable material, the proportions of parts being substantially the same as represented in the drawings, which are made on a scale of about one fourth of the true linear dimensions of the full-size hive. This box is so situated that its diagonal planes shall be in vertical and horizontal positions respectively; and is thus suspended from a suitable frame E, or from any other equivalent support. The suspension is conveniently effected by means of a hook I, secured in the frame or support, above, over which a loop $h$, attached to the hive, is hooked, as shown in the drawings.

To prevent undue swinging of the hive by the wind, it is proper, also to secure the side edges of the hive in a fixed position; which may be accomplished by means of staples $i, i,$ in the hive and side frame, or posts, on each side, and inserting a hasp or connecting staple $n$, therein, as represented. Where two or more hives are suspended side by side, the connecting staple may simply unite the adjacent staples of the hives. The lower edge of the box, as thus suspended, is further contracted by the extension of the lower portions of the ends, or heads, of the box, obliquely inward, toward a point at the bottom, as seen at $d, d$, Fig. 2. The extreme lower point of the box, being truncated a little distance upward, thereby forms a small rectangular opening H, some two or three inches across, toward which the inside of the box slopes, from all directions, at an angle of about 45 degrees from the horizon.

The lower portion D, of the box A, is occupied as a brood-chamber by the bees; and the portion of said box immediately beneath the two upper sides, is made to contain the honey-boxes B, B, B, B. In order to hold these honey-boxes in proper place, and to allow each to be withdrawn, or inserted, without disturbing the others, partitions $a, a, a,$ or their equivalents, are formed in the box A, substantially as shown, to separate said honey-boxes from the brood-chamber, and from each other. A long, narrow opening $b$, is made in the lower corner of each honey-box, as represented; and a corresponding opening $c$, is made in the partitions $a, a, a,$ respectively opposite to each of said openings in the honey-boxes. These openings are intended for passages for the bees, and also as outlets for excrement, moths and filth to escape, as will be presently explained. If any of the honey-boxes are not desired for use, at any time, they are drawn out and again inserted the opposite edge up, as shown by the upper box in Fig. 1, thereby shutting off the opening $b$, from the access of the bees.

The rear end A′, of the box A,—at least that portion opposite to the honey-boxes, and generally a portion opposite to the brood-chamber,—is hinged to the box, so that it may be turned down, for getting access to the honey-boxes; and to view the working of the bees, and their condition in said honey-boxes and in the brood-chamber. Glass $l$, should close the rear ends of the honey-boxes, and the portion of the brood-chamber exposed to view. The door should best fit into a rabbet groove in the side of the box A, as seen at the upper edge, in Fig. 2. It may be held closed by a button $m$, or otherwise, as convenient. The lower edges of the upper sides of the box A, may project a little, as seen at $k, k$, Fig. 1, to form dripping eaves, and to shade the hive below. A ventilating aperture $p$, is made in the front side of the hive, into the upper part of the brood-chamber. It is covered by a perforated plate $r$, or wire gauze, which is removable for the purpose of attaching a feeding apparatus, when desired, to be reached by the bees through said aperture $p$.

The construction and arrangement of the hive, as above described—a simple rectangular box, clipped at the lower corners, hung diagonally, with honey-boxes arranged with their sides parallel with its sides, and, hence, also, occupying similar positions in respect to their diagonal planes, the outlets from all the said honey-boxes, as well as those of the containing box A, being at the extreme lower edges thereof— produce a perfectly self-clearing hive throughout; since the bottoms of all the honey-boxes and that of the containing box slope downward, at an angle of about 45 degrees to the horizon, to the outlets thereof; and, at the same time, the upper sides of the containing box, having a similar slope, offer an effectual roof for shedding the rain from the hive. And all this is effected with a rectangular construction, of the simplest and cheapest character. It is also found to be a very effectual preventive of the moth. I am aware that an approximation to the principle of this construction has, in some instances, been attempted; but I am not aware that this complete, combined effect, in the simultaneous clearing of the honey-boxes and brood-chamber, by equally sloping sides, and outlets at the extreme bottom, and of a sloping roof outside, by the construction and arrangement of simple rectangular boxes, has ever previously been attained.

A lighting-board G, is hinged to the rear edge of the bottom outlet of the containing box A; and slopes downward and forward thence, as far as, and to any inclination, desired. In order to vary the inclination as may be required, to adjust the ventilation, or suit the convenience of the bees, an adjusting screw $u$, or its equivalent, is secured in the back of the hive, against which a plate $v$, projecting from the rear end of the lighting board abuts, and thus retains said lighting board in place, so that by turning said screw up or down, it may be brought to any required position. For the purpose of hiving bees, after swarming, this lighting board should be removed; and for that purpose, its hinge $t$, is made in the form of a hook, so that, by turning the board sufficiently far backward, the hinge will become unhooked. This can not take place so long as the plate $v$, is in the way; and the plate is, consequently, so pivoted to the lighting board that it can be turned around beneath said board, in the opposite direction, and thus cease to obstruct the movement of said board, substantially as represented.

In the lower edge of the front side $d$, of the containing box, a small notch $s$, is made, wide enough just to allow the working bees to pass through, when the lighting-board G, is brought close up to the hive, as shown by red lines in Fig. 2. It will then not allow a queen-bee to pass out. The width of aperture required for this purpose is about one fifth of an inch. The object of this is to prevent any more (late) swarms coming out, after the numbers in the parent hive shall have become sufficiently reduced for the season. In such a case, by closing up the lighting board G, neither queen being able to escape, one will soon be killed by the other; and, therefore, no further swarming will take place. This is to be repeated as often as a new queen is hatched, or there are indications of swarming again in the hive.

I do not claim hives nor honey-boxes with sloping bottoms, and outlets therefrom, simply; but

What I claim as my invention and desire to secure by Letters Patent, is—

The arrangement of a simple rectangular containing box, suspended diagonally, in combination with honey-boxes therein, arranged similarly, all having outlets or passages downward from their extreme lower edges, whereby the entire hive is rendered self-clearing, and a sloping roof, by the same arrangement, is produced, substantially as herein specified.

PETER TALTAVULL.

Witnesses:
J. S. BROWN,
EDW. F. BROWN.